(12) United States Patent
Suzuki

(10) Patent No.: US 6,573,957 B1
(45) Date of Patent: Jun. 3, 2003

(54) LIQUID CRYSTAL DISPLAY DEVICE

(75) Inventor: Shunji Suzuki, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 69 days.

(21) Appl. No.: 09/611,035

(22) Filed: Jul. 6, 2000

(30) Foreign Application Priority Data

Aug. 18, 1999 (JP) ............................................. 11-231997

(51) Int. Cl.[7] ............................................. G02F 1/1347
(52) U.S. Cl. ........................... 349/73; 349/44; 349/153; 349/110
(58) Field of Search .................................. 349/73, 153

(56) References Cited

U.S. PATENT DOCUMENTS 5,867,236 A * 2/1999 Babuka et al.
6,091,468 A * 7/2000 Kim et al.
6,177,912 B1 * 1/2001 Izumi
6,246,454 B1 * 6/2001 Koyama et al.

* cited by examiner

*Primary Examiner*—William L. Sikes
*Assistant Examiner*—P. R. Akkapeddi
(74) *Attorney, Agent, or Firm*—Scully, Scott, Murphy & Presser; Marian Underweiser, Esq.

(57) ABSTRACT

It is an object of the present invention to provide the liquid crystal display (LCD) device with a structure which can prevent the light of a back light from being passing through a bonding region, and can prevent the TFTs of the pixel regions from being damaged by the accumulated electrostatic charges, during the handling of each discrete LCD panel, the rubbing process of the alignment layer on the lower glass substrate 1, the assembling process of the LCD panels, and the handling of the completed tiling panel. The present invention is directed to a LCD device comprising a first LCD panel and a second LCD panel; wherein one edge of the first LCD panel is positioned in proximity and adjacent to one edge of the second LCD panel; and wherein a light shielding and electrically conductive adhesive bonds the one edge of the first LCD panel and the one edge of the second LCD panel.

21 Claims, 15 Drawing Sheets

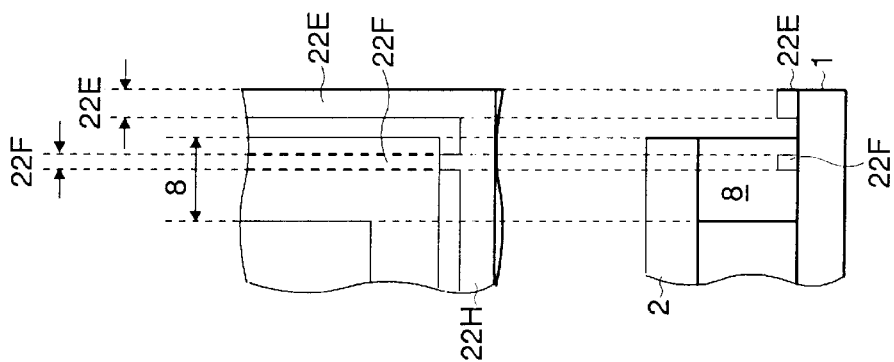
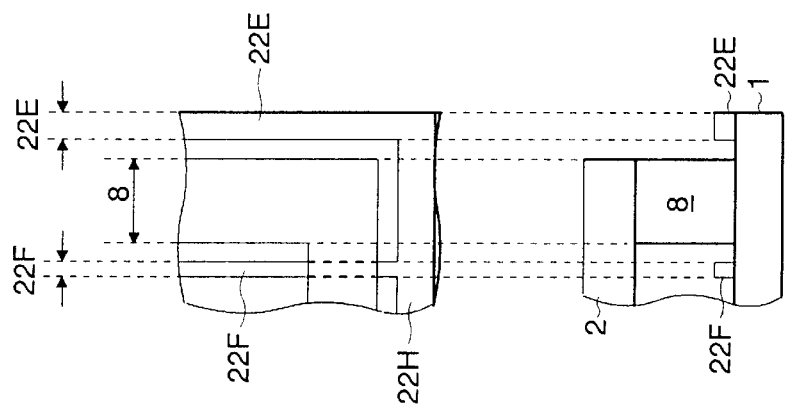
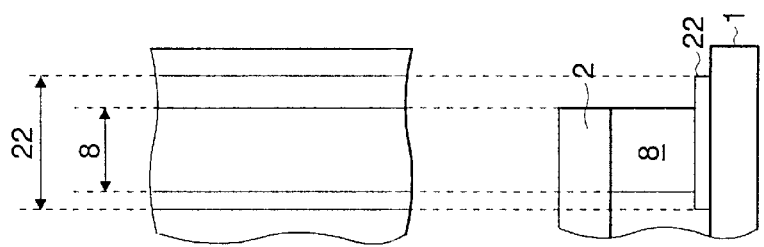
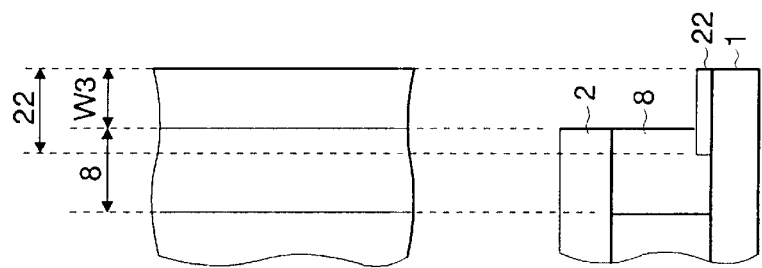

LIQUID CRYSTAL DISPLAY DEVICE

BACKGROUND OF THE INVENTION

Technical Field

The present invention relates to a liquid crystal display (LCD) device. More particularly, the present invention relates to the LCD device including a tiling panel in which a plurality of discrete LCD panels are bonded together to form a large size display screen.

PRIOR ART

The LCD device using as the tiling panel has been developed, in which a plurality of discrete LCD panels are bonded together. FIG. 1 shows the LCD device using the tiling panel to which the technology of the present invention is applicable. In the FIG. 1, the tiling panel includes four discrete LCD panels A, B, C and D, for example, which are bonded together along a bonding region 19. A cross point of the vertical bonding region 19 and the horizontal bonding region 19 is a center point (CT) of the tiling panel. Each of the LCD panels A, B, C and D includes a lower glass substrate 1 and an upper glass substrate 2. Next, the positional relationship of the pixels of the LCD panels A, B, C and D, which are located adjacent to the bonding region 19, is described. FIG. 2 shows an arrangement of pixel regions of the LCD panels A, B, C and D. It is assumed that a width of a black matrix disposed between the adjacent two pixel region in the horizontal direction is LH, and a width of the black matrix disposed between the adjacent two pixel regions in the vertical direction is LV. To display the natural and continuous image across the bonding regions 19, the distance between the pixel region PMN at the most lower right position of the panel A and the pixel region PM1 at the most lower left position of the panel B, and the distance between the pixel region P1N at the most upper right position of the panel D and the pixel region P11 at the most upper left position of the panel C should be the distance represented by 2L1+LB, wherein the L1<LH/2, and LB is the width of the bonding region 19. Further, the distance between the pixel region PMN of the panel A and the pixel region P1N of the panel D, and the distance between the pixel region PM1 of the panel B and the pixel region P11 of the panel C should be the distance represented by 2L2+LB, wherein the L2<LV/2. A sealing regions 8, later described, are shown by the dashed line in the FIG. 2.

Describing a structure of one LCD panel, such as the LCD panel A, used for the tiling panel, with reference to FIG. 3. The FIG. 3 shows the structure on the lower glass substrate 1 and the upper glass substrate 2 of the panel A. On the surface of the lower glass substrate 1, a plurality of data lines DL1 through DLN are formed along the vertical direction, a plurality of gate lines GL1 through GLM are formed along the horizontal direction, one pixel region including a thin film transistor (TFT) 3 and the pixel electrode 4 defining one pixel (P) is formed at each of the cross points of the data lines and the gate lines, an outer short ring 5 and an inner short ring 6 made of an electrically conductive material are formed, and an alignment layer made of polyimide, not shown in the FIGS. 1 and 2 are formed. The arrangement of the liquid crystal molecules is decided by a rubbing direction on the surface of the alignment layer, in the rubbing process. On the surface of the upper glass substrate 2, a common electrode and the alignment layer, not shown in the FIGS. 1 and 2, are formed. In the case of a color LCD device, color filters, i.e. Red color filters, Green color filters and Blue color filters, are formed on the upper glass substrate 2.

At the completion of the lower glass substrate 1, both the outer and inner short rings 5 and 6 are formed. The lower glass substrate 1 is cut along cutting lines 9A through 9D, so that the outer short ring 5 and the right side portion and the lower portion of the inner short ring 6 are removed. Before the cutting process, the outer short ring 5 is connected to a potential level corresponding to the potential level of the common electrode. The outer short ring 5 is connected to the inner short ring 6 through resistive element 7. Each of the data lines DL1 through DLN is connected to the outer short ring 5 and the inner short ring 6 through the resistive element 7, respectively, and each of the gate lines GL1 through GLM is connected to the outer short ring 5 and the inner short ring 6 through the resistive element 7, respectively. The purpose of the outer and inner short rings 5 and 6 is to prevent the TFT 3 of the pixel region from being damaged by electrostatic discharge (ESD) during the fabrication of the LCD panel, in the following manner. A resistive value of the resistive element 7, such as a TFT operating as a diode, is designed to be lower than a resistive value of the TFT 3 of the pixel region. When the electrostatic charges are applied to the gate lines, for example, during the handling of the lower glass substrate 1, the resistive element 7 connected between the gate lines and the short ring 6, and the resistive element 7 connected between the short ring 8 and the data lines conduct, whereby the electric potential level at the gate lines becomes equal to the electric potential at the data lines, and no voltage is applied between the drain and gate electrodes of the TFT 3 of the pixel region. After the cutting of the lower glass substrate 1 and the assemble of the upper glass substrate 2 on the lower glass substrate 1, the inner short ring 6 is connected to the common electrode on the upper glass substrate 2, so that when the electrostatic charges are applied to the gate line(s) or the data line(s), the resistive elements 7 conduct to pass the electrostatic charges to the common electrode through the inner ring 6, resulting that the electric potential level at the lower glass substrate 1 becomes equal to the electric potential of the common electrode on at the upper glass substrate 2, and no voltage is applied to the TFT 3 of the pixel region.

The lower glass substrate 1 and the upper glass substrate 2 are sealed along the sealing region 8 to complete the panel A, as well known in the art. Describing the formation of the sealing region 8 of the panel A with reference to the FIG. 2, the right side portion of the sealing region 8 is formed adjacent to the pixel regions of the right most data line DLN, and the lower side portion of the sealing region 8 is formed adjacent to the pixel regions of the lower most gate line GLM, to provide the distance L1 and the distance L2 (FIG. 2), respectively after the cutting process. It is required to provide the positional relationship of the pixel regions on the LCD panels A, B, C and D, as shown in the FIG. 2. For this reason, the right side and lower side portions of the sealing region 8 are formed inside of the inner short ring 6. A typical width W1 of the sealing region 8 is about 500 through 1000 $\mu$m, and the width W2 of the sealing area 8 remaining along the cutting lines 9B and 9D is about 50 through 100 $\mu$m. Therefore, the LCD panel A includes the short ring 6 along the upper side and the left side, and does not include the short ring 6 along the right side and the lower side. A flexible circuit board or TAB (Tape Automated Bonding) tape, on which circuit modules, such as data line drivers are mounted, is connected to the data lines, which are exposed in an upper side area 10 (FIG. 3), and a flexible circuit board or the TAB tape, on which circuit modules, such as gate line drivers are mounted, is connected to the gate lines, which are exposed on a left side area 11 (FIG. 3). In a similar manner as the LCD panel A, the LCD panels B, C and D are formed by changing the position of the cutting lines.

The four LCD panels A, B, C and D constitutes one LCD display screen, and the data line drivers of the four LCD panels and the gate line drivers of the four LCD panels are controlled to display the image on the four LCD panels.

To bond the LCD panels, a light shielding and insulating adhesive, as shown in Japanese Published Examined Patent Application 2-59999, has been used. A first problem is that, during the handling of the completed tiling panel using the light shielding and insulating adhesive, a large quantity of electrostatic charges are accumulated on the completed tiling panel, and the TFTs 3 of the pixel regions adjacent to the bonding region 19 are damaged, for the reason that after that a plurality of LCD panels have been assembled on a supporting glass substrate 26, as shown in FIG. 4, a total surface area of the completed tiling panel becomes large, and hence a large quantity of electrostatic charges accumulated due to a friction induced during the handling of the completed tiling panel, and the accumulated electrostatic charges tend to discharge to the data line(s) or the gate line(s) proximity to the bonding region 19.

It is required that all the four LCD panels A, B, C and D have the same display characteristic, i.e. as a wide viewing angle providing a good contrast ratio. The user usually sees the LCD device along a lower side direction L, which located at the lower side of a vertical line to the surface of the FIG. 1, and hence, the rubbing direction of the alignment layer of the four LCD panels A, B, C and D, as shown in the FIG. 1 have been used to realize the wide viewing angle providing the good contrast ratio in the lower side direction L. In the FIG. 1, an arrow with double dotted line indicates the rubbing direction of the alignment layer on the lower glass substrate 1, and an arrow with a single solid line indicates the rubbing direction of the alignment layer of the upper glass substrate 2.

For the above reason, the same rubbing direction, i.e. the direction from the upper left region to the lower right region, is used in the alignment layers of the lower glass substrate 1 of all the four LCD panels A, B, C and D. A second problem is that the TFTs 3 of the pixel regions on the LCD panel C is damaged by the ESD (electrostatic discharge) during the rubbing process since the inner short ring 6 is removed from the upper edge and the left edge of the LCD panel C. More particularly, when a well known rubbing roller, not shown, initially touches the surface of the alignment layer of the LCD panel C at the upper left corner, the electrostatic charges are applied to the data lines or the gate lines, so that the TFTs 3 of the pixel regions are damaged. In contradistinction, the LCD panel A has the short ring 6 formed along the upper edge and the left edge, so that the electrostatic charges applied from the rubbing roller can be guided to the short ring 6, which is connected to the common electrode potential, whereby the TFTs of the pixel regions on the LCD panel A are protected from the ESD. The LCD panel B has the short ring 6 formed along the upper edge and the right edge, and the LCD panel D has the short ring 6 formed along the left edge and the bottom edge, so that the electrostatic charges applied from the rubbing roller can be guided to the short ring 6, whereby the TFTs of the pixel regions on the LCD panels B and D can be protected from the ESD.

As described before, the data lines, the gate lines and the pixel regions of each LCD panel are proximity and adjacent to the bonding region 19, so that the electrostatic charges, which are accumulated on the glass substrate 1 during the handling of each discrete LCD panel, and the rubbing process of the LCD panels, tend to discharge to the data lines or the gate lines, and in the worst case, the TFTs 3 of the pixel regions are damaged, resulting a defect called as a dot defect or a line defect. It is a third problem.

SUMMARY OF THE INVENTION

It is an object of the present invention to provide the LCD device with a structure which can prevent the light of a back light device from passing through the bonding region, and can prevent the TFTs of the pixel regions from being damaged by the accumulated electrostatic charges, during the handling of each discrete LCD panel, the rubbing process of the alignment layer on the lower glass substrate 1, the assembling process of the LCD panels, and the handling of the completed tiling panel.

A LCD device according to the present invention comprises:

a first LCD panel in which a pixel array substrate, on which a pixel array is formed, and an opposing substrate, on which a common electrode is formed, are sealed along a sealing region surrounding the pixel array; and a second LCD panel in which a pixel array substrate, on which a pixel array is formed, and an opposing substrate, on which a common electrode is formed, are sealed along a sealing region surrounding the pixel array;

wherein one edge of the first LCD panel is positioned in proximity and adjacent to one edge of the second LCD panel; and wherein a light shielding and electrically conductive adhesive bonds the one edge of the first LCD panel and the one edge of the second LCD panel.

The light shielding and electrically conductive adhesive is electrically connected to the common electrodes on the opposing substrates on the first and second LCD panels.

A short ring is formed along remaining edges of each of the pixel array substrates of the first and second LCD panels, respectively; and wherein the light shielding and electrically conductive adhesive is electrically connected to the short rings.

The sealing region along the one edge of each of the pixel array substrates of the first and second LCD panels is separated from the one edge to expose a surface region of each of the pixel array substrates, respectively;

a contact electrode is formed on each of the surface regions of the pixel array substrates of the first and second LCD panels, the contact electrode on the pixel array substrate of the first LCD panel is connected to the short ring on the pixel array substrate of the first LCD panel, and the contact electrode on the pixel array substrate of the second LCD panel is connected to the short ring on the pixel array substrate of the second LCD panel; and the light shielding and electrically conductive adhesive is electrically and mechanically bonded to the contact electrode on the pixel array substrate of the first LCD panel and to the contact electrode on the pixel array substrate of the second LCD panel.

The short ring on the pixel array substrate is connected to the common electrode on the opposing substrate.

The first and second LCD panels are fixed to a transparent supporting substrate.

An upper surface of each of the first and second LCD panels is fixed to a first transparent supporting substrate, and a lower surface of each of the first and second LCD panels is fixed to a second transparent supporting substrate.

A short ring is formed along remaining edges of each of the pixel array substrates of the first and second LCD panels, respectively, a contact electrode connected to the short ring is formed on a surface, along the one edge, of the pixel array substrate of each of the first and second LCD panels, and an edge of the contact electrode is aligned to an edge of the sealing region along the one edge.

A LCD device according to the present invention comprises:

an upper left LCD panel in which a pixel array substrate, on which a pixel array is formed, and an opposing substrate, on which a common electrode is formed, are sealed along a sealing region surrounding the pixel array;

an upper right LCD panel in which a pixel array substrate, on which a pixel array is formed, and an opposing substrate, on which a common electrode is formed, are sealed along a sealing region surrounding the pixel array;

a lower right LCD panel in which a pixel array substrate, on which a pixel array is formed, and an opposing substrate, on which a common electrode is formed, are sealed along a sealing region surrounding the pixel array; and a lower left LCD panel in which a pixel array substrate, on which a pixel array is formed, and an opposing substrate, on which a common electrode is formed, are sealed along a sealing region surrounding the pixel array;

wherein a right edge of the upper left LCD panel is positioned in proximity and adjacent to a left edge of the upper right LCD panel;

wherein a bottom edge of the upper right LCD panel is positioned in proximity and adjacent to a top edge of the lower right LCD panel;

wherein a left edge of the lower right LCD panel is positioned in proximity and adjacent to a right edge of the lower left LCD panel;

wherein a top edge of the lower left LCD panel is positioned in proximity and adjacent to a bottom edge of the upper left LCD panel; and wherein a light shielding and electrically conductive adhesive bonds the right edge of the upper left LCD panel and the left edge of the upper right LCD panel, bonds the bottom edge of the upper right LCD panel and the top edge of the lower right LCD panel, bonds the left edge of the lower right LCD panel and the right edge of the lower left LCD panel, and bonds the top edge of the lower left LCD panel and the bottom edge of the upper left LCD panel.

The light shielding and electrically conductive adhesive is electrically connected to the common electrodes on each of the opposing substrates on the upper left LCD panel, the upper right LCD panel, the lower right LCD panel and the lower left LCD panel.

A short ring is formed along remaining edges of each of the pixel array substrates of the upper left LCD panel, the upper right LCD panel, the lower right LCD panel and the lower left LCD panel, respectively; and the light shielding and electrically conductive adhesive is electrically connected to the short rings.

The sealing region along the right edge and the bottom edge of the pixel array substrate of the upper left LCD panel is separated from right edge and the bottom edge to expose a surface region of the pixel array substrate, respectively, and a contact electrode is formed on the surface region along at least one of the right edge and the bottom edge;

the sealing region along the left edge and the bottom edge of the pixel array substrate of the upper right LCD panel is separated from left edge and the bottom edge to expose a surface region of the pixel array substrate, respectively, and a contact electrode is formed on the surface region along at least one of the left edge and the bottom edge;

the sealing region along the top edge and the left edge of the pixel array substrate of the lower right LCD panel is separated from top edge and the left edge to expose a surface region of the pixel array substrate, respectively, and a contact electrode is formed on the surface region along at least one of the top edge and the left edge;

the sealing region along the right edge and the top edge of the pixel array substrate of the lower left LCD panel is separated from right edge and the top edge to expose a surface region of the pixel array substrate, respectively, and a contact electrode is formed on the surface region along at least one of the right edge and the top edge;

the contact electrodes are connected to the short rings; and the light shielding and electrically conductive adhesive is electrically and mechanically bonded to the contact electrodes.

The short ring on the pixel array substrate is connected to the common electrode on the opposing substrate.

The upper left LCD panel, the upper right LCD panel, the lower right LCD panel and the lower left LCD panel are fixed to a transparent supporting substrate.

An upper surface of each of the upper left LCD panel, the upper right LCD panel, the lower right LCD panel and the lower left LCD panel is fixed to a first transparent supporting substrate, and a lower surface of each of the upper left LCD panel, the upper right LCD panel, the lower right LCD panel and the lower left LCD panel is fixed to a second transparent supporting substrate.

A portion of the contact electrode is covered by the sealing region.

The contact electrode is separated from the edge of the pixel array substrate.

The contact electrode comprises a first portion formed on the surface region and a second portion formed between the sealing region and the pixel array, and the first portion and the second portion are connected.

The contact electrode comprises a first portion formed on the surface region and a second portion covered by the sealing region, and the first portion and the second portion are connected.

A short-ring is formed along a top edge and a left edge of the pixel array substrate of the upper left LCD panel, a contact electrode connected to the short ring is formed on a surface, along the right edge and the bottom edge, of the pixel array substrate, and an edge of the contact electrode is aligned to edges of the sealing region along the right edge and the bottom edge, a short ring is formed along a top edge and a right edge of the pixel array substrate of the upper right LCD panel, a contact electrode connected to the short ring is formed on a surface, along the left edge and the bottom edge, of the pixel array substrate, and an edge of the contact electrode is aligned to edges of the sealing region along the left edge and the bottom edge, a short ring is formed along a right edge and a bottom edge of the pixel array substrate of the lower right LCD panel, a contact electrode connected to the short ring is formed on a surface, along the top edge and the left edge, of the pixel array substrate, and an edge of the contact electrode is aligned to edges of the sealing region along the top edge and the left edge, and a short ring is formed along a left edge and a bottom edge of the pixel array substrate of the lower left LCD panel, a contact electrode connected to the short ring is formed on a surface, along the right edge and the top edge, of the pixel array substrate, and an edge of the contact electrode is aligned to edges of the sealing region along the right edge and the top edge.

A contact electrodes is formed on an outside surface region, which exists outside of the sealing region, of the pixel array substrate of the upper left LCD panel, at each of an upper right corner region and the lower left corner region, respectively;

a contact electrodes is formed on an outside surface region, which exists outside of the sealing region, of the pixel array substrate of the upper right LCD panel, at each of a lower right corner region and an upper left corner region, respectively;

a contact electrodes is formed on an outside surface region, which exists outside of the sealing region, of the pixel array substrate of the lower right LCD panel, at each of an upper right corner region and the lower left corner region, respectively; and a contact electrodes is formed on an outside surface region, which exists outside of the sealing region, of the pixel array substrate of the lower left LCD panel, at each of a lower right corner region and an upper left corner region, respectively.

BRIEF DESCRIPTION OF DRAWINGS

Preferred embodiments of the present invention will now be described by way of example only, with reference to the accompanying drawings in which:

FIG. 11 shows the cross sections of various structures of the contact electrode 22, along the line 14—14 in the FIG. 7, which can be used in place of the contact region 22A and 22B.

DETAILED DESCRIPTION OF THE PREFERRED EMBODIMENTS OF THE INVENTION

Figure 4:
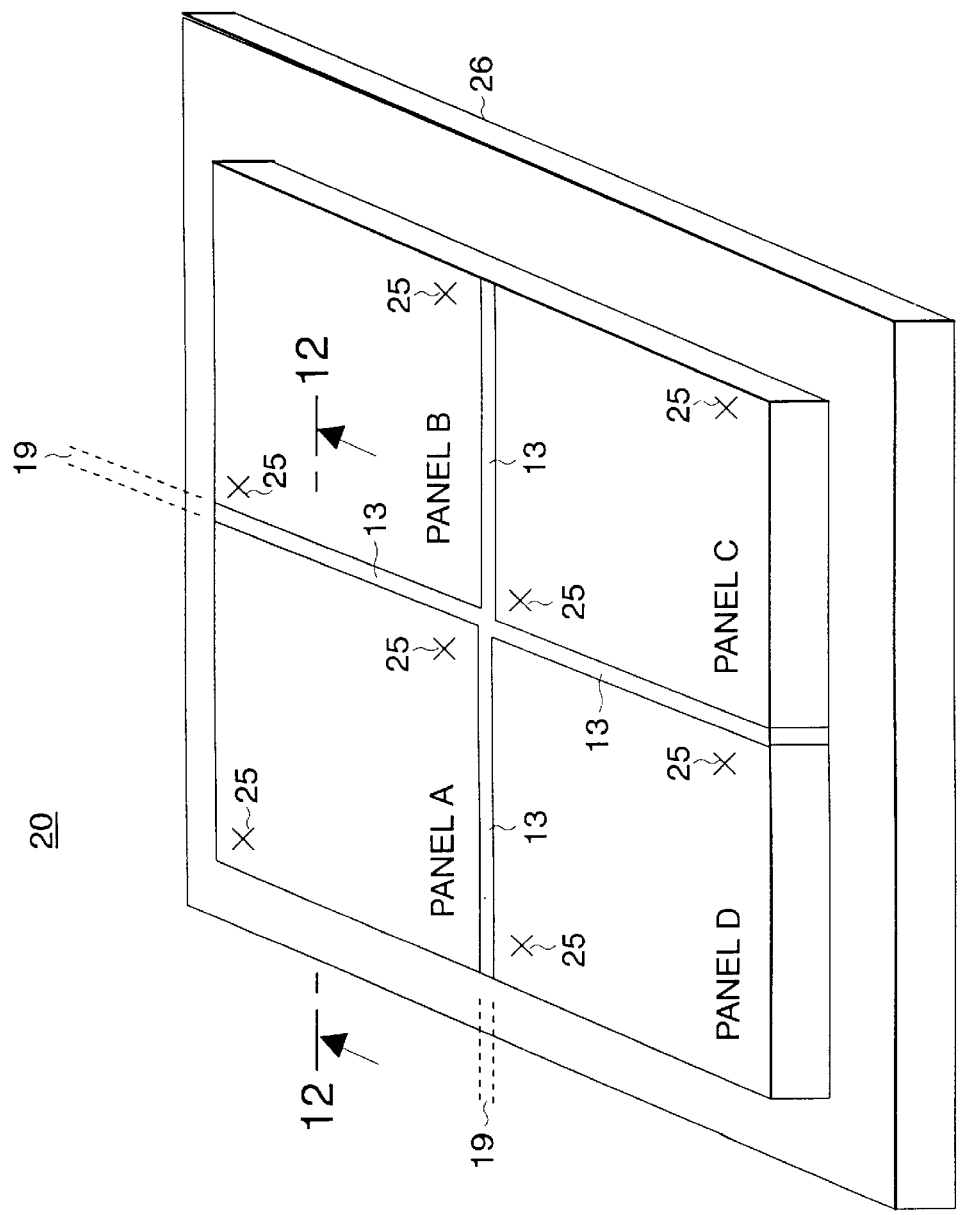
FIG. 4 shows the tiling panel 20 assembled on a substrate 26 in accordance with the present invention.

FIG. 4 shows the tiling panel 20 assembled on a substrate 26, in accordance with the first embodiment of the present invention. The substrate 26 can be a mere assembling tool plate, which is used only to precisely position the four LCD panels A, B, C and D. To precisely position the four LCD panels on the substrate 26, positioning marks 25 are provided on each of the four LCD panels and the substrate 26. After the four LCD panels A, B, C and D are precisely positioned to define the bonding region 19 therebetween, a light shielding and electrically conductive adhesive 13, described later, is applied in the bonding region 19 to bond the four LCD panels A, B, C and D, to complete the tiling panel 20. In this case, the tiling panel 20 including the four LCD panels A, B, C and D is removed from the assembling tool plate 26 after the completion of the tiling panel 20.

The assembling tool plate 26 can be replaced by a transparent glass substrate, which operates as a transparent supporting substrate for firmly fixing the four LCD panels A, B, C and D.

Figure 5:
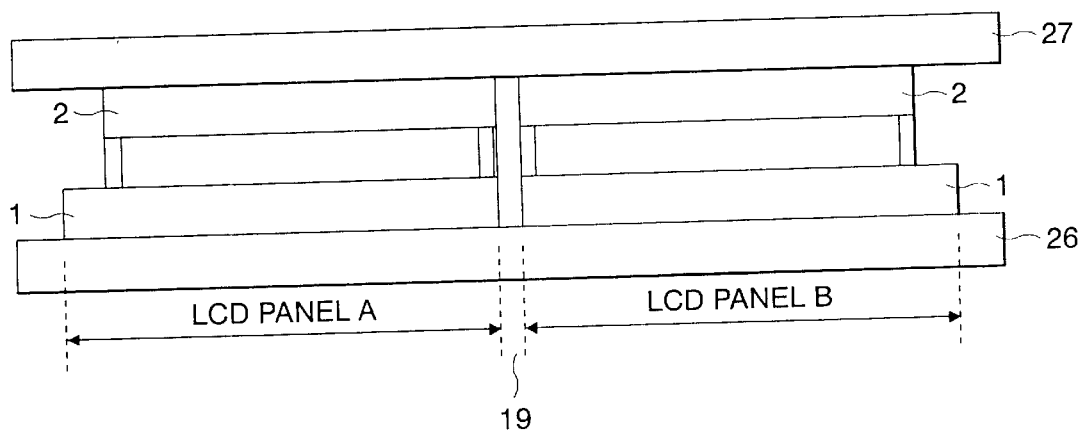
FIG. 5 shows an alternative structure of the tiling panel 20 in accordance with the present invention.

FIG. 5 shows an alternative structure of the tiling panel 20, in which an additional or first transparent glass substrate 27 is bonded on the upper surface of the opposing glass substrate 2 of each of the LCD panels A, B, C and D. The transparent glass supporting substrate 26 operates as a second substrate. It is noted that only the LCD panels A and B are shown in the FIG. 5.

Figure 6:
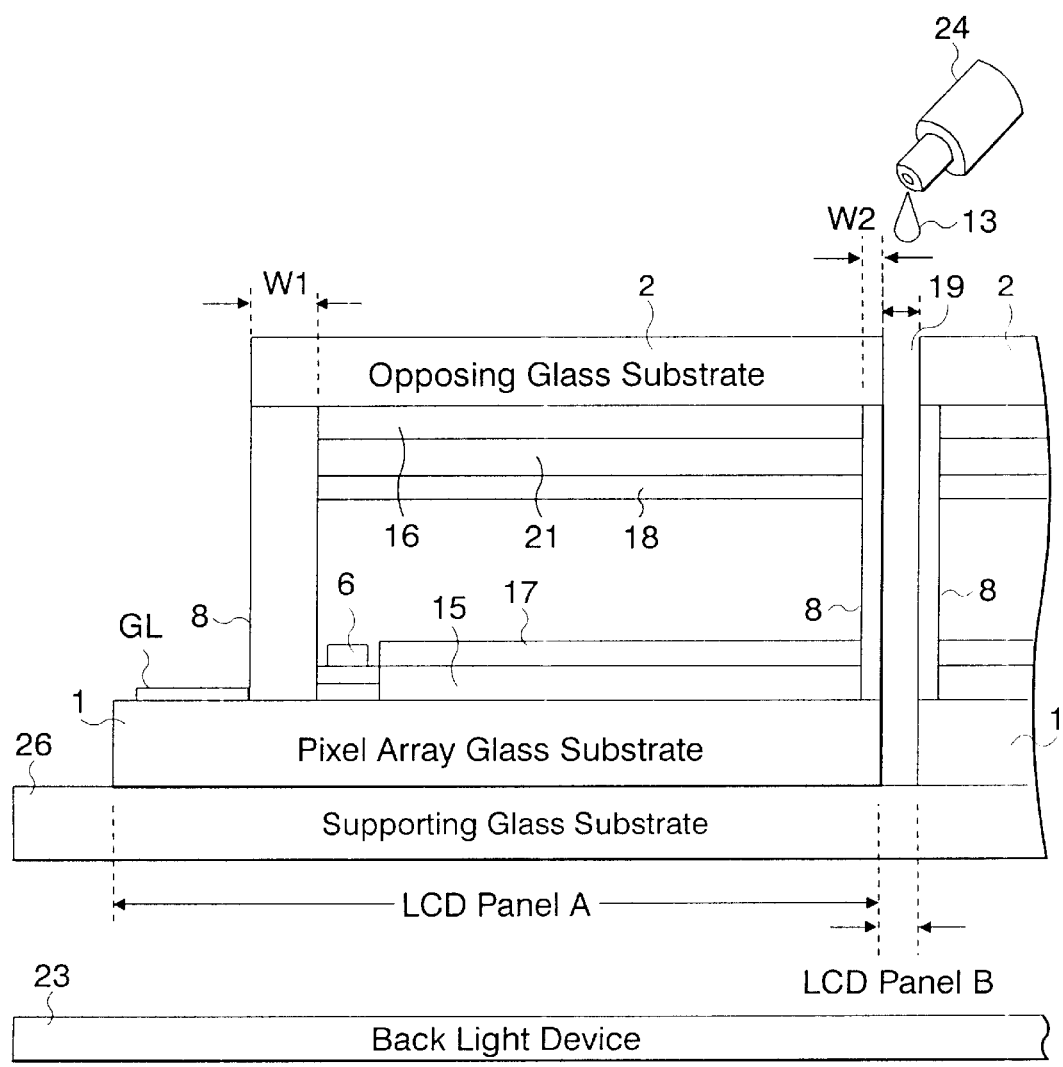
FIG. 6 shows a cross section of the structure of the tiling panel of the first embodiment of the present invention.

The FIG. 6 shows a cross section of the structure of the tiling panel of the first embodiment of the present invention. The cross section is obtained along the line 12—12 in the FIG. 4. On the surface of the transparent or glass substrate 1, (a) a pixel array, shown as a layer 15, which includes a plurality of data lines DL1 through DLN extending along the vertical direction, a plurality of gate lines GL1 through GLM extending along the horizontal direction, and a plurality of pixel regions, each of which is formed at each of the cross points of the data lines and the gate lines, (b) the inner short ring 6 for preventing the TFTs 3 of the pixel regions from being damaged by the ESD, and (c) an alignment layer 17 are formed. Therefore, the glass substrate 1 is called as a pixel array glass substrate hereinafter. As described before with reference to the FIG. 3, one pixel region includes the pixel electrode P, and the thin film transistor (TFT) 3 having a source electrode connected to the pixel electrode P, a drain electrode connected to the data line and a gate electrode connected to the gate line. The major part of the short ring 6 connected to the resistive element 7 is formed inside of the sealing region 8, and a remaining portion of the short ring 6 extends to the edge of the pixel array glass substrate 1 through the sealing region 8, as shown in the FIGS. 3 and 7.

On the surface of the transparent or glass substrate 2, the color filters, i.e. Red color filters, Green color filters and Blue color filters, shown as a layer 16, the common electrode shown as a layer 21, and the alignment layer 18 are formed. The glass substrate 2 is called as an opposing glass substrate hereinafter.

Each of the pixel array glass substrate 1 is cut in the manner described with reference to the FIG. 3 to satisfy the positional relationship shown in the FIG. 2, to display the natural and continuous image over the bonding regions 19. As described before with reference to the FIG. 2, the distance between the pixel region PMN at the most lower right position of the panel A and the pixel region PM1 at the most lower left position of the panel B, and the distance between the pixel region P1N at the most upper right position of the panel D and the pixel region P11 at the most upper left position of the panel C should be the distance represented by 2L1+LB, wherein the L1<LH/2, and LB is the width of the bonding region 19. Further, the distance between the pixel region PMN of the panel A and the pixel region P1N of the panel D, and the distance between the pixel region PM1 of the panel B and the pixel region P11 of the panel C should be the distance represented by 2L2+LB, wherein the L2<LV/2.

Figure 1:
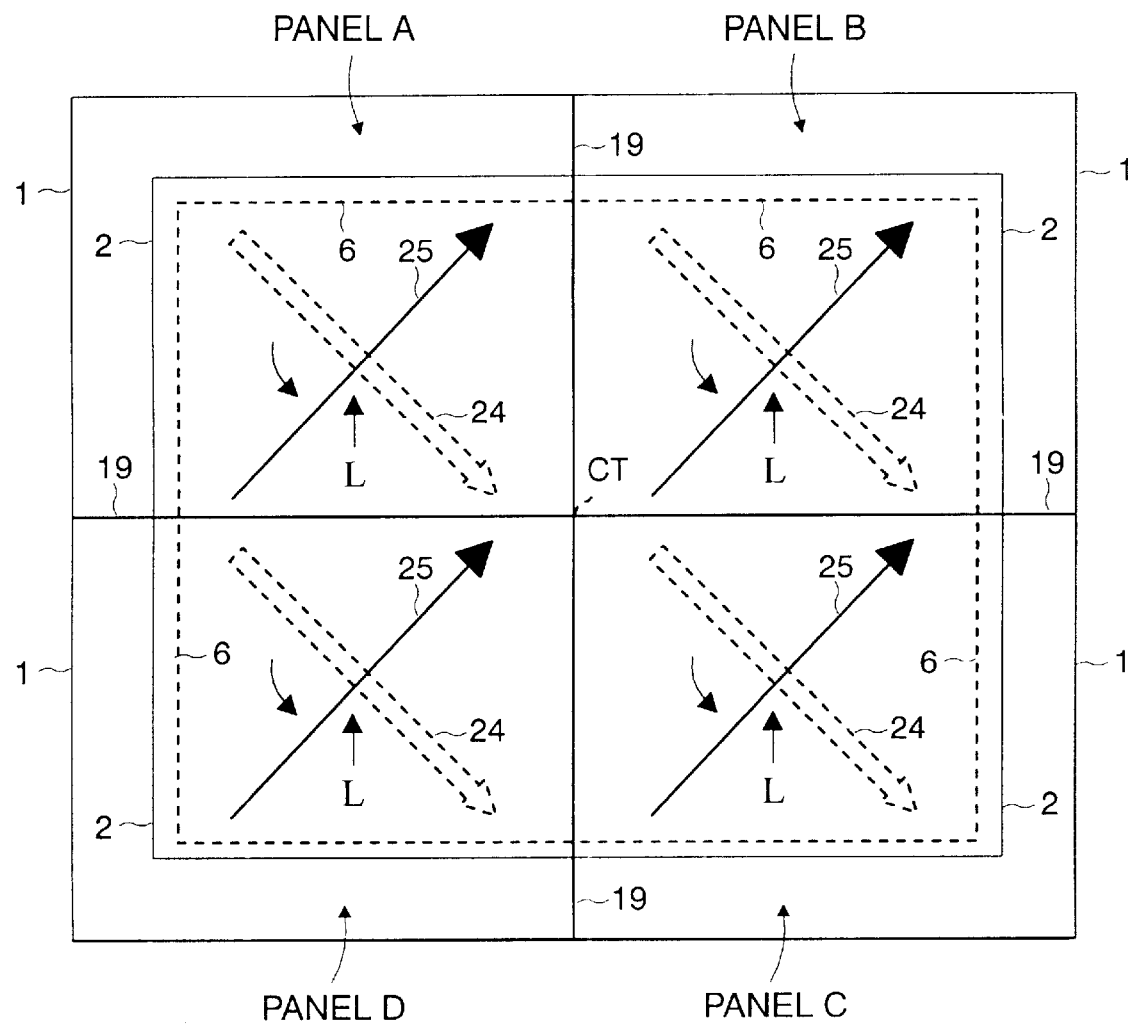
FIG. 1 shows the LCD device using the tiling panel to which the technology of the present invention is applicable.

After the cutting process, the alignment layer 17 on the pixel array glass substrate 1 of each of the LCD panels A, B, C and D is rubbed in the direction from the upper left region to the lower right region, as shown by the arrow with double dotted line in the FIG. 1, and the alignment layer 18 on the opposing glass substrate 2 of each of the LCD panels A, B, C and D is rubbed in the direction from a lower left region to an upper right region, as shown by the arrow with single solid line in the FIG. 1, and the pixel array glass substrate 1 and the opposing glass substrate 2 are sealed along the sealing region 8 to complete the LCD panel. The sealing region 8 surrounds the pixel array. In the LCD panel A, the left side short ring 6 is adjacent to the left side sealing region 8. The space enclosed by the sealing region 8 and the two alignment layers 17 and 18 is filled with the 90 degree twisted nematic (TN) liquid crystal material with a chiral material causing the liquid crystal molecules to rotate in a counter clockwise direction.

The right edge of the upper left LCD panel A is positioned in proximity and adjacent to the left edge of the upper right LCD panel B; the bottom edge of the LCD panel B is positioned in proximity and adjacent to the top edge of the lower right LCD panel C; the left edge of the LCD panel C is positioned in proximity and adjacent to the right edge of the lower left LCD panel D; and the top edge of the LCD panel D is positioned in proximity and adjacent to the bottom edge of the LCD panel A, as shown in the FIG. 4. The LCD panel A, B, C and D are bonded by the light shielding and electrically conductive adhesive 13 filled into the bonding region 19. The bonding edge of the opposing glass substrate 2, the, bonding edge of the sealing region 8, and the bonding edge of the pixel array glass substrate 1 are aligned each other, as shown in the FIG. 6.

The light shielding and electrically conductive adhesive 13 is applied into the bonding region 19 by a well known manner in the art, such as a dispenser 24, as shown in the FIG. 6 and cured or hardened. The light shielding and electrically conductive adhesive 13 of the present invention operates as (1) a light shielding layer or a black matrix for preventing the light of a back light device 23 mounted below the back side of the tiling panel 20 from passing through the bonding region 19, (2) the adhesive for bonding the LCD panels, and (3) the electrical conductor, as described later. The light shielding and electrically conductive adhesives 13, which can be used in the present invention are, (a) a temperature-sensitive electrically conductive adhesive, such as an epoxy resin mixed with electrically conductive filler, e.g. silver fine particles, carbon fine particles; a rosin resin mixed with the silver fine particles; and an urethan resin mixed with the silver fine particles and plasticizer, (b) an electrically conductive silicone rubber mixed with electrically conductive filler, e.g. the silver fine particles, the carbon fine particles, and (c) an ultraviolet rays-sensitive resin mixed with electrically conductive filler, e.g. carbon black.

The light shielding and electrically conductive adhesive 13 in the bonding region 19 running along the horizontal and vertical directions can absorb the electrostatic charges induced during the handling of the completed tilling panel 20, so that the damage of the TFTs 3 of the pixel regions proximity to the bonding region 19 due to the ESD can be prevented.

Figure 7:
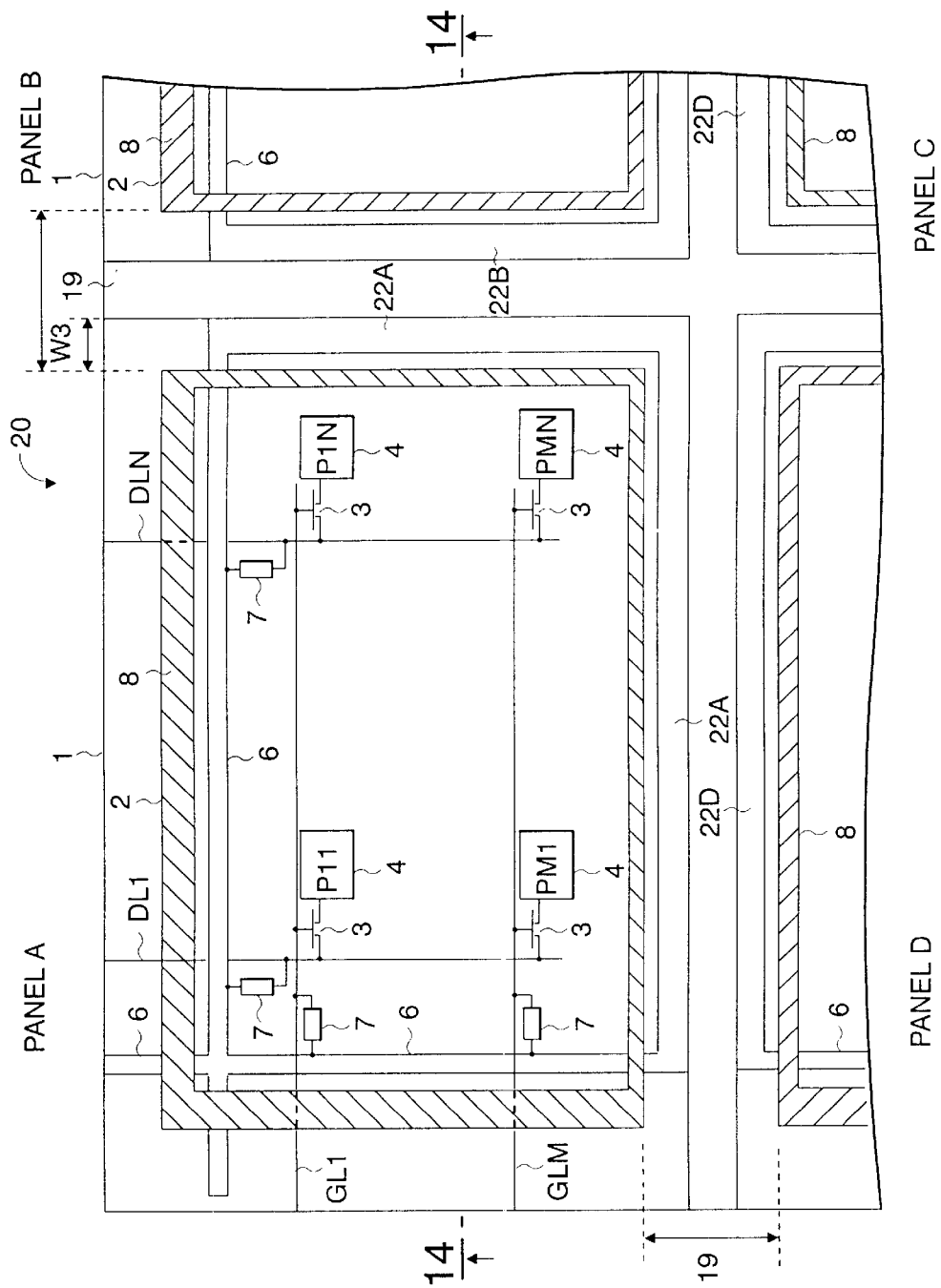
FIG. 7 shows a plan view of the tiling panel 20 of the second embodiment in accordance with the present invention.

FIG. 7 shows a plan view of the tiling panel 20 of the second embodiment in accordance with the present invention.

Figure 3:
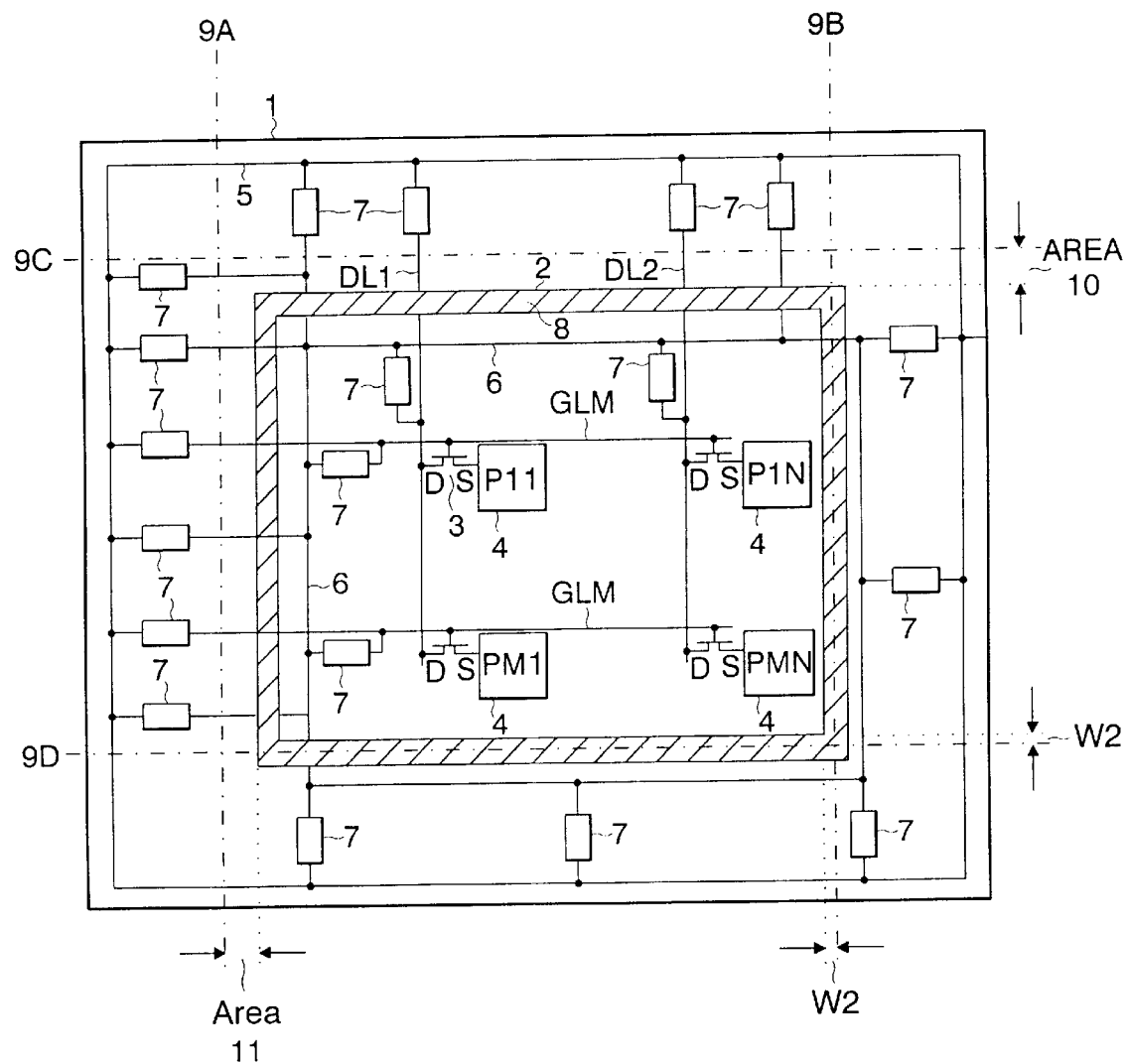
FIG. 3 shows the structure on the lower glass substrate 1 and the upper glass substrate 2 of the panel A.
Figure 8:
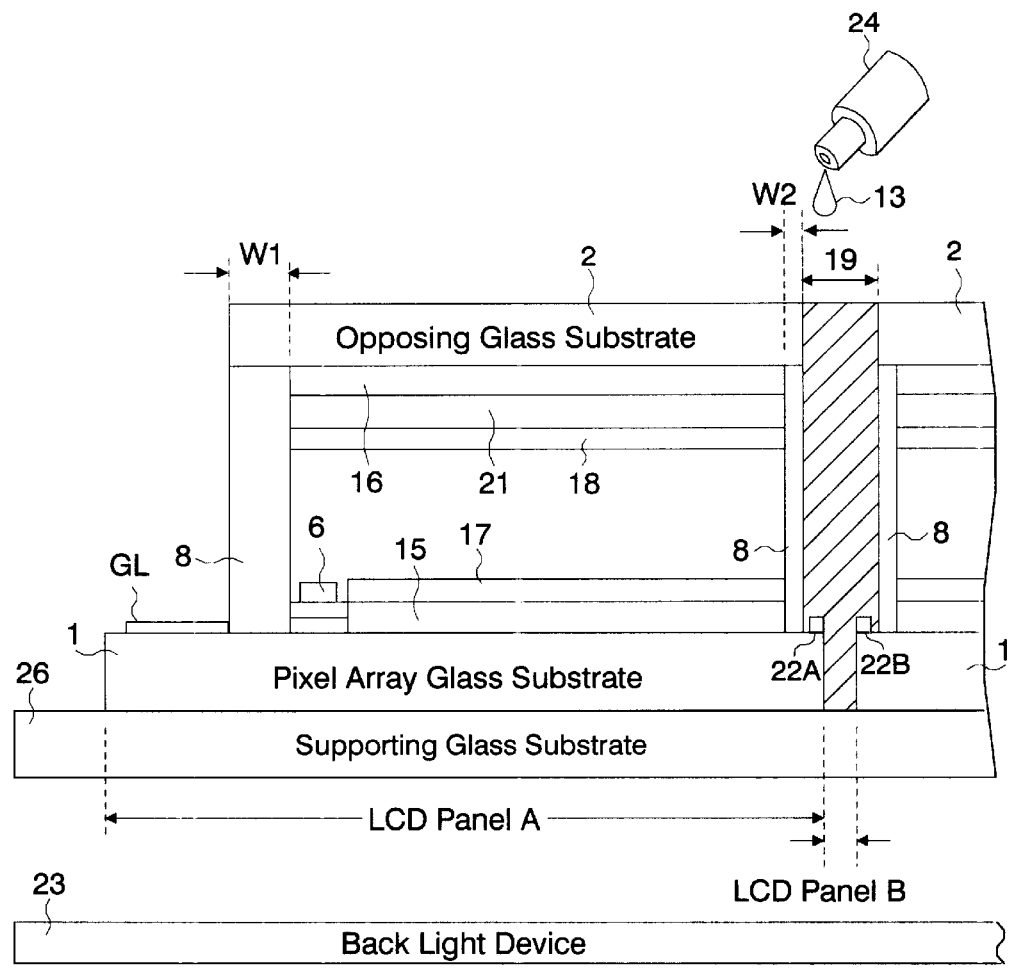
FIG. 8 shows the cross section of the LCD panels A and a portion of the LCD panel B along the lines 14—14 shown in the FIG. 7.

The same reference numerals as that of the FIG. 3 indicate the elements which are the same as that of the FIG. 3, and these elements in the FIG. 7 are constituted and operated as described before. FIG. 8 shows the cross section of the LCD panels A and a portion of the LCD panel B along the lines 14—14 shown in the FIG. 7. In accordance with the second embodiment of the present invention, a contact electrode 22, which is connected to the short ring 6, is formed on a portion of the surface areas adjacent to the two edges, which are used for the bonding, of the pixel array substrate 1. The short ring 6 is further connected to the voltage potential Vcc of the common electrode 21 of the opposing glass substrate 2 through a circuit connection, not shown. It is noted that the width of the short ring 6 and the contact electrode 22 is widened in the FIGS. 7 and 8 for assisting the understanding of the structure and the operation thereof.

Describing the short ring 6, in the upper left LCD panel A, the short ring 6 is formed along the top edge and the left edge of the pixel array substrate 1; in the upper right LCD panel B, the short ring 6 is formed along the top edge and the right edge of the pixel array substrate 1; in the lower right LCD panel C, the short ring 6 is formed along the right edge and the bottom edge of the pixel array substrate 1; and in the lower left LCD panel D, the short ring 6 is formed along the bottom edge and the left edge of the pixel array substrate 1. It is noted that the short rings along the right edge of the LCD panel B, along the right edge and the bottom edge of the LCD panel C, and along the bottom edge of the LCD panel D are not shown in the FIG. 7.

Describing the structure adjacent to the bonding edges, in detail, the sealing region 8 along the bonding edges of the pixel array substrates 1 of each of the LCD panels A, B, C and D is separated from the bonding edges, to expose a portion of surface region of the pixel array glass substrates 1. Describing the structure of the upper left LCD panel A, the position of the sealing region 8 along the right side bonding edge is separated from this right side bonding edge by a predetermined distance W3 (about 5 through 30 μm) to expose a portion of the surface region of the pixel array glass substrate 1 along the right side bonding edge, and the position of the sealing region 8 along the bottom side bonding edge is separated from this bottom side bonding edge by the above predetermined distance W3 to expose a portion of the surface region of the pixel array glass substrate 1 along the bottom side bonding edge. The contact electrode 22A is formed on the surface region, which is located between the right side and bottom side bonding edges and the sealing region 8.

In the same manner as that of the LCD panel A, the contact electrode 22B is formed on the surface region, which is located between the left side and bottom side bonding edges and the sealing region 8, of the pixel array glass substrate 1 of the upper right LCD panel B, the contact electrode 22C is formed on the surface region, which is located between the top side and left side bonding edges and the sealing region 8, of the pixel array glass substrate 1 of the lower right LCD panel C, and the contact electrode 22D is formed on the surface region, which is located between the right side and top side bonding edges and the sealing region 8, of the pixel array glass substrate 1 of the lower left LCD panel D.

Describing the difference between the contact electrode 22A of the LCD panel A of the present invention, for example, and the inner short ring 6 along the right side and the lower side on the prior pixel array glass substrate 1, as shown in the FIG. 3, the prior short ring 6 is formed at an outside position of the cutting lines 9B and 9D, and hence is removed during the fabricating process, while the contact electrode 22A of the present invention is intentionally formed at an inside position of the cutting lines 9B and 9D, so that the contact electrode 22A can stay on the surface areas of the pixel array glass substrate 1 adjacent to the two edges, which are used for the bonding, of the LCD panel A.

The contact electrode 22 of the present invention performs (1) the function of the short ring 6, so that when the alignment layer on the pixel array glass substrate 1 of the LCD panel C is rubbed, the electrostatic charges applied from the rubbing roller can be guided to the contact electrode 22C, shown in the FIG. 7, which is connected to the common electrode potential, whereby the TFTs of the pixel regions on the LCD panel C can be protected from the ESD, (2) the function of the contact region to a light shielding and electrically conductive adhesive 13, so that any electrostatic charges accumulated in the region adjacent to the bonding region 19 on the completed tiling panel 20 can be guided to the common electrode potential through the light shielding and electrically conductive adhesive 13, the contact electrode 22A, 22B, 22C and/or 22D and the short ring 6, whereby the damage of the TFTs 3 of the pixel regions arranged proximity to the bonding region 19 can be prevented.

The bonding region 19 between the two LCD panels is defined by the space between the pixel array glass substrate 1 of one LCD panel, such as the LCD panel A, and the pixel array glass substrate 1 of the other LCD panel, such as the LCD panel B; the space between the sealing region 8 of one LCD panel, such as the LCD panel A, and the sealing region 8 of the other LCD panel, such as the LCD panel B; and the space between the opposing glass substrate 2 of one LCD panel, such as the LCD panel A, and the opposing glass substrate 2 of the other LCD panel, such as the LCD panel B. And, the contact electrodes 22A, 22B, 22C and 22D are exposed to the bonding regions 19, respectively.

The light shielding and electrically conductive adhesive 13, as described before, is applied into the bonding region 19 by a well known manner in the art, such as the dispenser 24, as shown in the FIG. 8 and cured or hardened, and the tiling panel 20 is completed.

Describing the meritorious effect of the second embodiment, during the positioning process, shown in the FIG. 4, the LCD panels are slided on the supporting glass substrate 26, and the electrostatic charges are accumulated on the LCD panels. In the case of the prior LCD panels, as shown in the FIG. 1, the TFTs 3 in the pixel regions adjacent to the bonding region 19 are damaged due to the ESD. Such damage in the positioning process can be prevented in the present invention, since the contact electrode 22A, 22B, 22C and 22D of the discrete LCD panels operate as the short ring 6. Even if the electrostatic charges are discharged, the electric potential at the short ring 6, the contact electrode 22A, 22B, 22C and 22D, and the common electrode 21 become to the same value, so that the damage of the TFTs 3 in the pixel regions can be prevented. After the positioning process, each of the LCD panels is bonded on the supporting glass substrate 26 by a transparent adhesive well known in the art, and the light shielding and electrically conductive adhesive 13 is applied into the bonding region 19 and cured. The light shielding and electrically conductive adhesive 13 interconnects the contact electrodes 22A, 22B, 22C and 22D to assist to make the electric potential of all the common electrodes 21 of the four LCD panels to the same level, so that an uniform display characteristic can be reliably realized on all the four LCD panels.

Figure 9:
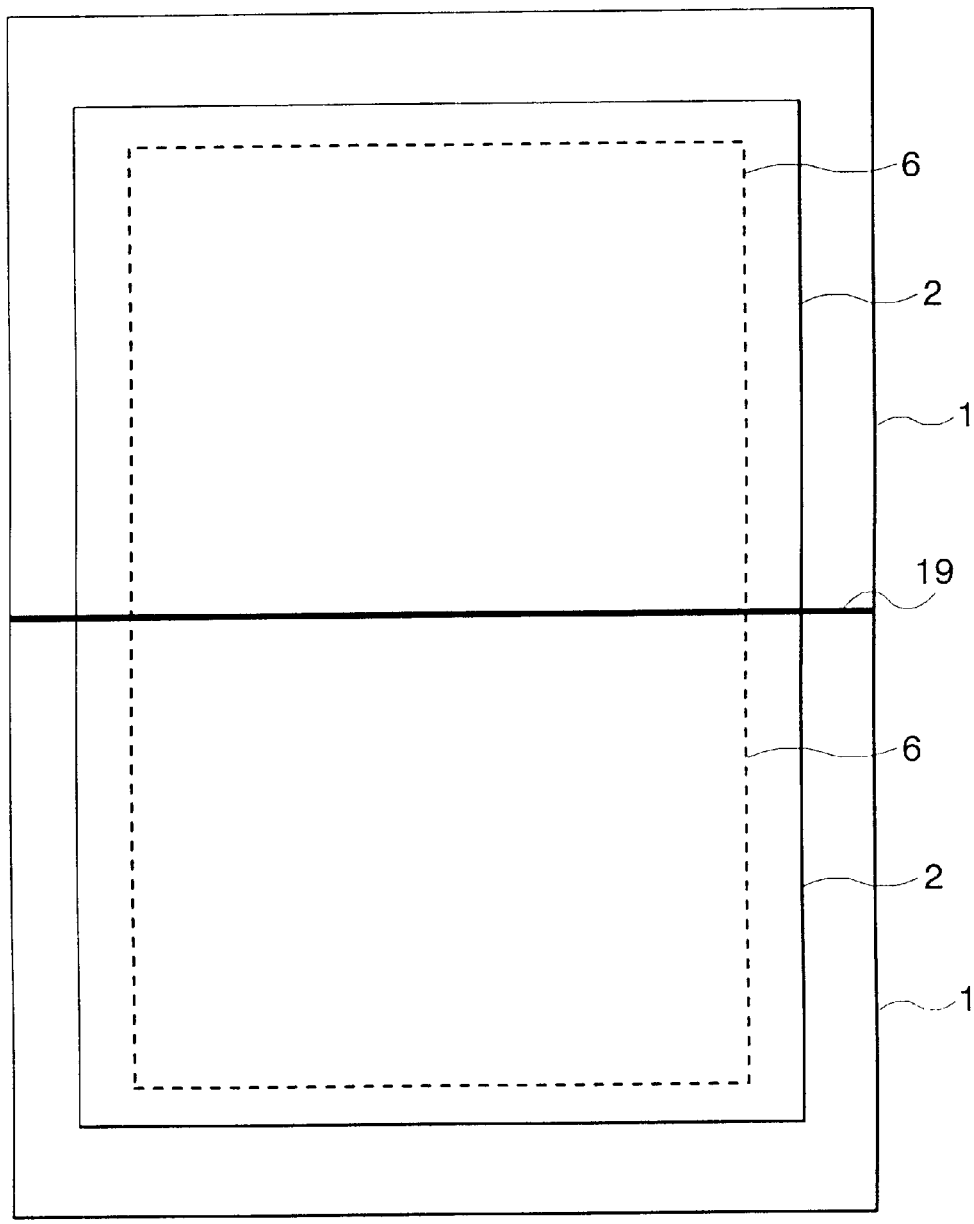
FIG. 9 shows the tiling panel constituted by two LCD panels of the first or second embodiment.

Although the tiling panels of first and second embodiments are constituted by the four LCD panels, the tiling panel can be constituted by two LCD panels, such as the two LCD panels A and D or the two panels B and C arranged in the vertical direction. In the case that the two vertical LCD panels A and D shown in the FIG. 7 are used, the short ring 6 along the right edge is removed. But, the pixel array glass substrate 1 can be cut to leave the short ring 6 along the right edge as shown in FIG. 9. In the same manner, the pixel array glass substrate 1 can be cut to leave the short ring 6 along the left edge, in the case that the two vertical LCD panels B and C are used. Further, the tiling panel can be constituted by the two LCD panels A and B or the two panels D and C arranged in the horizontal direction.

Figure 10:
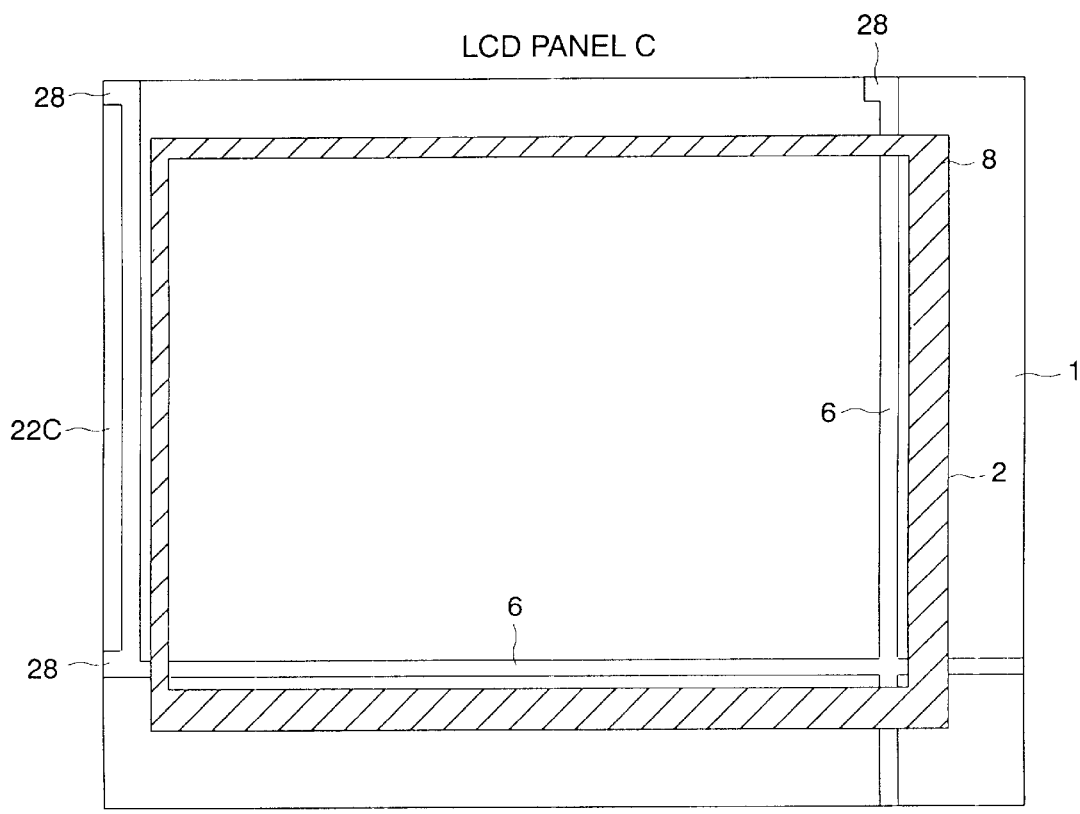
FIG. 10 shows an alternative arrangement of the contact electrode 22 which can be used in place of that shown in the FIG. 7.

FIG. 10 shows an alternative arrangement of the contact electrode 22 which can be used in place of that shown in the FIG. 7. The alternative arrangement is described by using the LCD panel C. The contact electrode 22C is formed on the surface region between the left edge used for the bonding and the sealing region 8 of the pixel array glass substrate 1 of the LCD panel C. Three contact regions 28 are formed along the left and top edges, to which the light shielding and electrically conductive adhesive 13 is mechanically and electrically connected. In this manner, the contact electrode 22 is formed on the surface region along at least one of the two edges used for the bonding on each of the pixel array glass substrates 1 of the LCD panels A, B, C and D. For example, the contact electrode 22 is formed on the right edge of the LCD panel A, the bottom edge of the LCD panel B, the left edge of the LCD panel C and the top edge of the LCD panel D, respectively. Alternatively, the contact electrode 22 is formed on the right edge of the LCD panel A, the left edge of the LCD panel B, the left edge of the LCD panel C and the right edge of the LCD panel D, respectively. Alternatively, the contact electrode 22 is formed on the bottom edge of the LCD panel A, the bottom edge of the LCD panel B, the top edge of the LCD panel C and the top edge of the LCD panel D, respectively.

FIG. 11 shows the cross sections of various alternative structures of the contact electrode 22, along the line 14—14 in the FIG. 7, and these structures can be used in place of the contact electrode 22A and 22B shown in the FIG. 7. In the structure shown in the FIG. 11(A), a rear portion, which is adjacent to the pixel array, of the contact electrode 22 is placed below the sealing region 8, and is covered by the sealing region 8. Since the rear portion of the contact electrode 22 extends below the sealing region 8, the contact electrode 22 with the width, which is wider than the width W3, shown in the FIG. 7, can be realized, so that the adhesive force of the contact electrode 22 to the surface region can be increased.

In the structure shown in the FIG. 11(B), a front edge, which is adjacent to the bonding edge, of the contact electrode 22 is backed away or separated from the bonding edge. In other words, the contact electrode 22 is formed to expose a portion of surface region adjacent to the bonding edge of the pixel array glass substrate 1. Since the front edge is backed away from the bonding edge, an accidental peel off of the front edge from the surface region can be prevented.

In the structure shown in the FIG. 11(C), the contact electrode 22 comprises a first portion 22E formed on the surface region between the bonding edge and the sealing region 8, and a second portion 22F formed between the sealing region 8 and the pixel array, and the first portion 22E and the second portion 22F are electrically connected. Further the second portion 22F is connected to the short ring 6 extending along the top edge, not shown, and hence even if both the first portion 22E extending along the vertical direction and portion 22H extending along the horizontal direction are accidentally broken, the second portion 22F connects the remaining portion of the contact electrode 22 to the short ring 6.

In the structure shown in the FIG. 11(D), the contact electrode 22 comprises the first portion 22E formed on the surface region between the bonding edge and the sealing region 8, and the second portion 22F formed below the sealing region 8. The first portion 22E and the second portion 22F are electrically connected. The second portion 22F is completely covered by the sealing region 8, so that the adhesion of the sealing region 8 to the pixel array glass substrate 1 can be improved.

Figure 12:
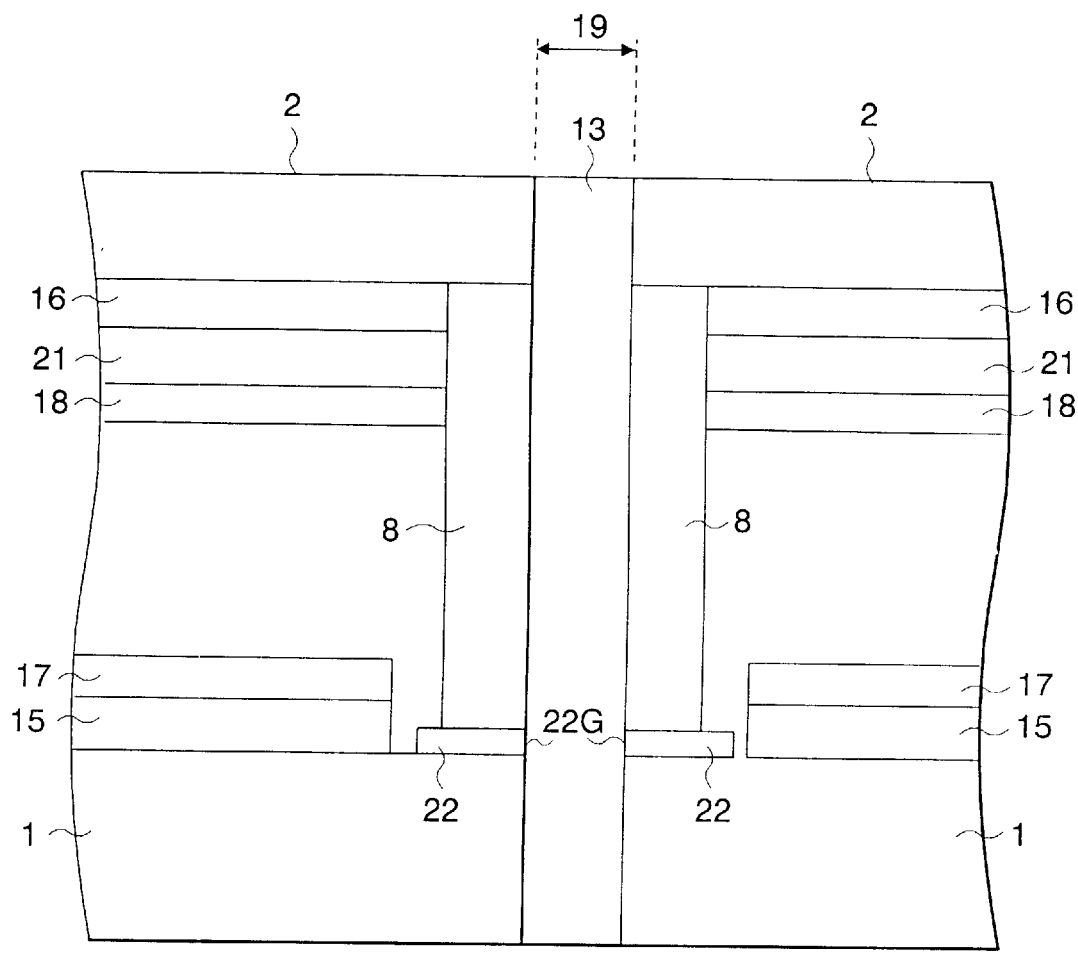
FIG. 12 shows a plan view of the tiling panel 20 of the fourth embodiment in accordance with the present invention.

FIG. 12 shows the cross section of the structure of the contact electrode 22 of the third embodiment in accordance with the present invention. The cross section is obtained along a part of the line 12—12 in the FIG. 4. In this third embodiment, an edge 22G of each of the contact electrode 22 is aligned to the edges of the glass substrate 1 and 2, and the edge of the sealing region 8, as shown in the FIG. 12. The edge 22G of the contact electrode 22 is exposed to the bonding region 19, and the upper surface of the contact electrode 22 is covered by the sealing region 8. When the light shielding and electrically conductive adhesive 13 is applied, the adhesive 13 electrically connects to the exposed edge 22G of the contact electrode 22.

The structure of the contact electrode 22 of the third embodiment can be used in the four LCD panels A, B, C and D shown in the FIG. 7 with the following modification. More particularly, the short ring 6 is formed along the top edge and the left edge of the pixel array glass. substrate 1 of the upper left LCD panel A, the contact electrode 22 connected to the short ring 6 is formed on a surface, along the right edge and the bottom edge, of the pixel array glass substrate 1, and the edge 22G of the contact electrode 22 is aligned to edges of the sealing region 8 along the right edge and the bottom edge; the short ring 6 is formed along the top edge and the right edge of the pixel array glass substrate 1 of the upper right LCD panel B, the contact electrode 22 connected to the short ring 6 is formed on a surface, along the left edge and the bottom edge, of the pixel array glass substrate 1, and the edge 22G of the contact electrode 22 is aligned to edges of the sealing region 8 along the left edge and the bottom edge; the short ring 6 is formed along the right edge and the bottom edge of the pixel array glass substrate 1 of the lower right LCD panel C, the contact electrode 22 connected to the short ring 6 is formed on a surface, along the top edge and the left edge, of the pixel array glass substrate 1, and the edge 22G of the contact electrode 22 is aligned to edges of the sealing region 8 along the top edge and the left, edge; and the short ring 6 is formed along the left edge and the bottom edge of the pixel array glass substrate 1 of the lower left LCD panel D, the contact electrode 22 connected to the short ring 6 is formed on a surface, along the right edge and the top edge, of the pixel array glass substrate 1, and the edge 22G of the contact electrode 22 is aligned to edges of the sealing region 8 along the right edge and the top edge.

Figure 13:
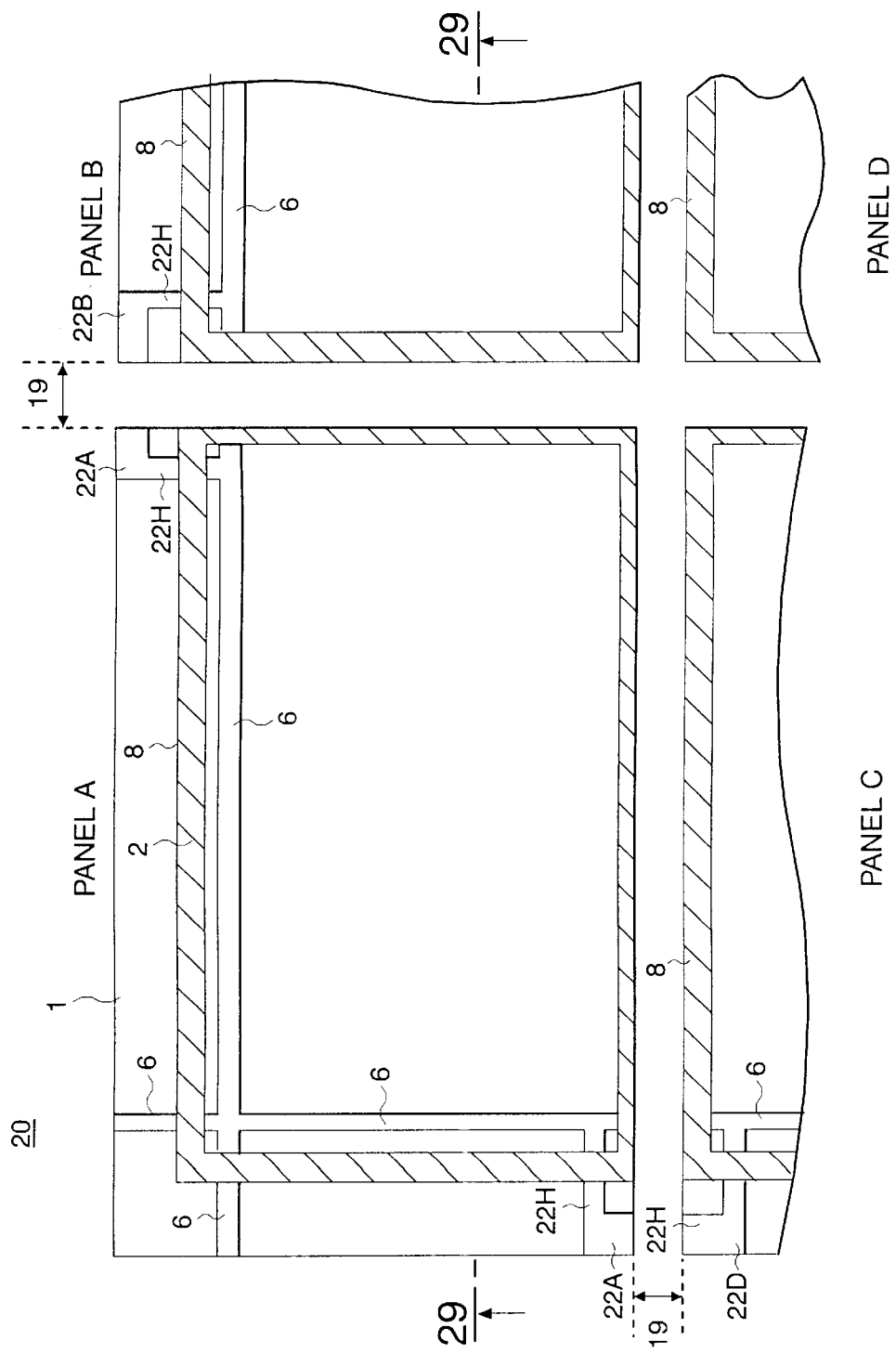
FIG. 13 shows a plan view of the tiling panel 20 of the fourth embodiment in accordance with the present invention.

FIG. 13 shows a plan view of the tiling panel 20 of the fourth embodiment in accordance with the present invention. Each of the LCD panels A, B, C and D includes the resistive elements 7 and the pixel array, as shown in the FIG. 7. But these are not shown in the FIG. 13 for simplifying the drawing. The cross section of the tiling panel 20 in the FIG. 13 along the line 29—29 is the same as that shown in the FIG. 6. In the fourth embodiment, each of the contact regions 22, i.e. 22A, 22B, 22C and 22D, is formed on the outer surface region, which exists outside of the sealing region 8, of the pixel array glass substrate 1, at a corner region, which is adjacent to the bonding edge. Each of the contact electrode 22, i.e. 22A, 22B, 22C and 22D, is connected to the short ring 6 through a connecting portion 22H.

Figure 14:
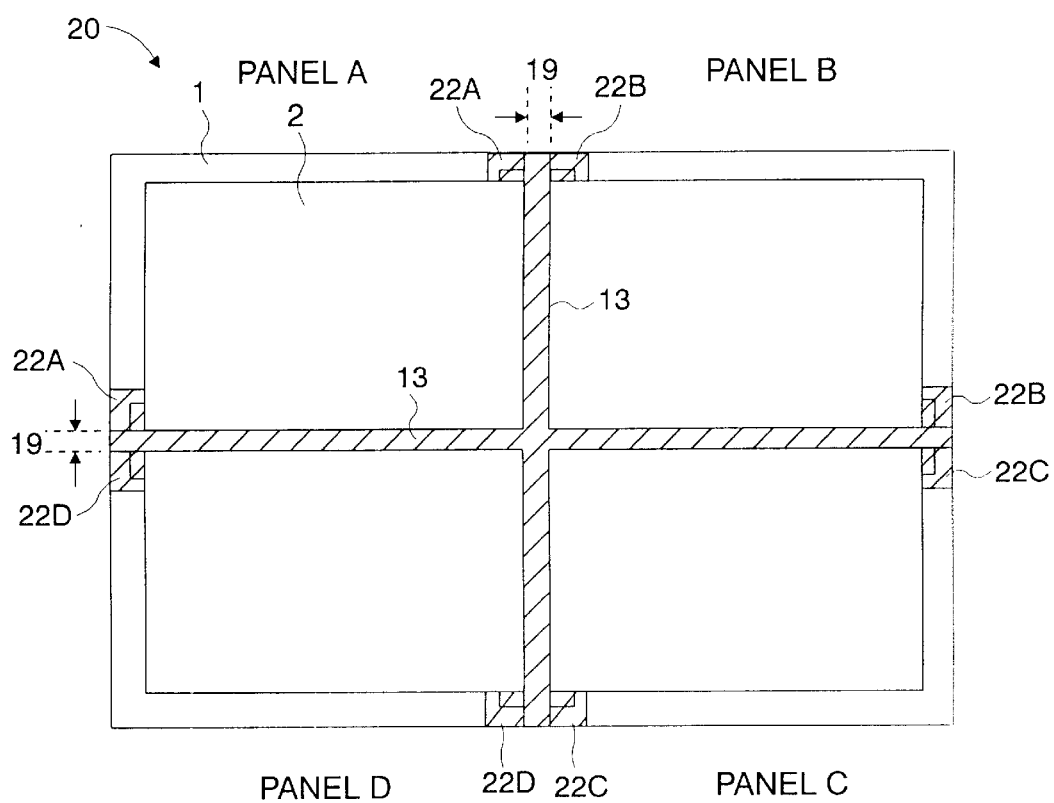
FIG. 14 shows a plan view of the entire tiling panel 20 in which the light shielding and electrically conductive adhesive 13 is applied in the bonding region 19 and on the contact electrodes 22A, 22B, 22C and 22D of the four LCD panels.

FIG. 14 shows a plan view of the entire tiling panel 20 in which the light shielding and electrically conductive adhesive 13 is applied in the bonding region 19 and on the contact electrodes 22A, 22B, 22C and 22D of the four LCD panels. The light shielding and electrically conductive adhesive 13 is electrically connected to the respective common electrode on the opposing glass substrate 2 through the contact electrode 22 and the short ring 6. It is noted that only the contact electrode 22A, 22B, 22C and 22D, and the light shielding and electrically conductive adhesive 13 are shown in the FIG. 14.

As shown in the FIG. 14, the two contact electrodes 22A are formed on the outside surface region, which exists outside of the sealing region 8, of the pixel array glass substrate 1 of the LCD panel A, at a position of an upper right corner region adjacent to the right edge and the lower left corner region adjacent to the bottom edge, respectively. In the same manner, as shown in the FIG. 14, the two contact electrodes 22B are formed on the outside surface region of the pixel array glass substrate 1 of the LCD panel B, at a position of an upper left corner region and the lower right corner region, respectively; the two contact electrodes 22C are formed on the outside surface region of the pixel array glass substrate 1 of the LCD panel C, at a position of an upper right corner region and the lower left corner region, respectively; and the two contact electrodes 22D are formed on the outside surface region of the pixel array glass substrate 1 of the LCD panel D, at a position of a lower right corner region and an upper left corner region, respectively.

Figure 15:
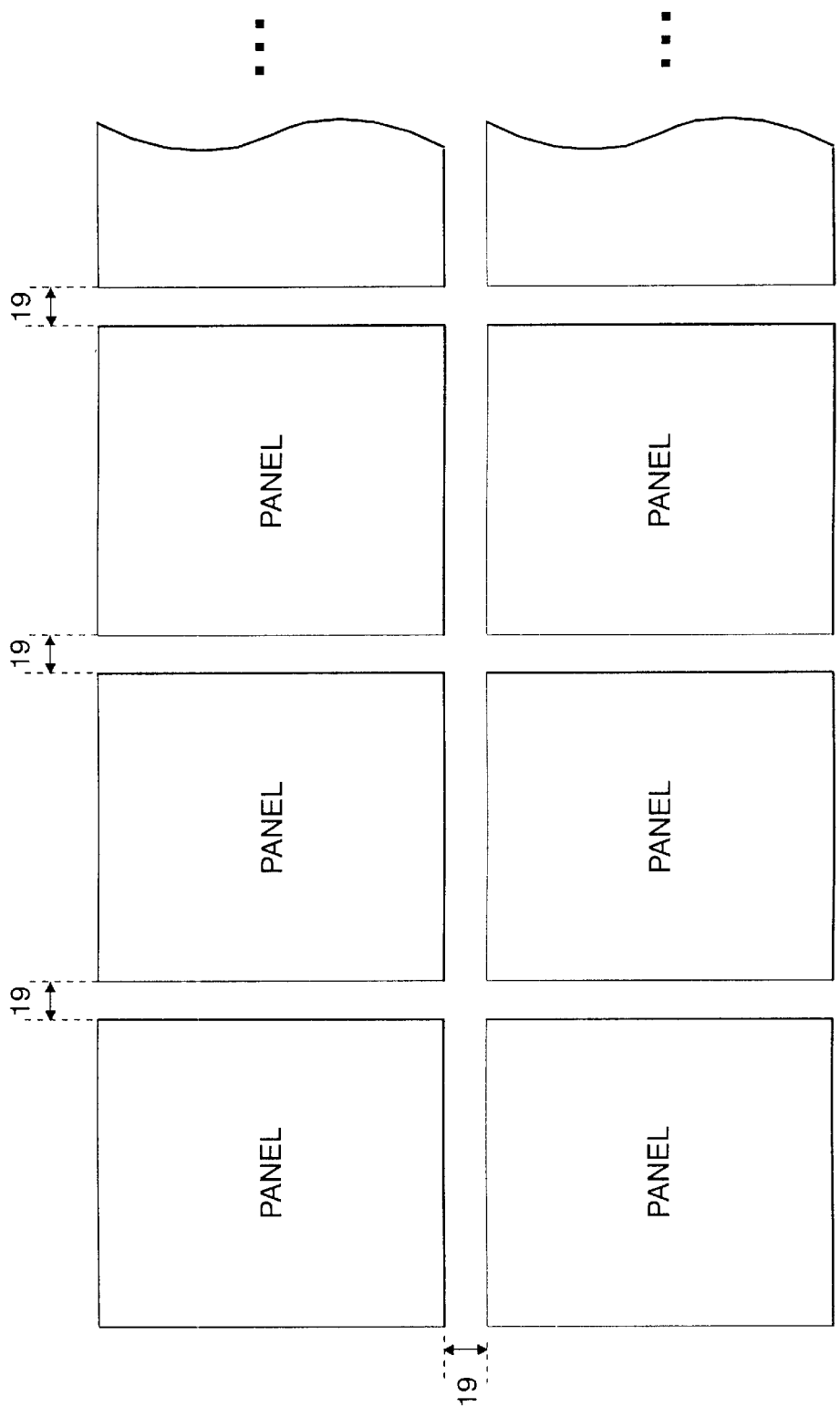
FIG. 15 shows an alternative tiling panel in accordance with the present invention.

FIG. 15 shows an alternative tiling panel in accordance with the present invention. Although the tiling panels including two LCD panels and the four LCD panels, respectively are shown in the specification as the embodiment, the principle of the present invention can be used to bond the three LCD panels or the LCD panels more than four, as shown in the FIG. 15.

Figure 2:
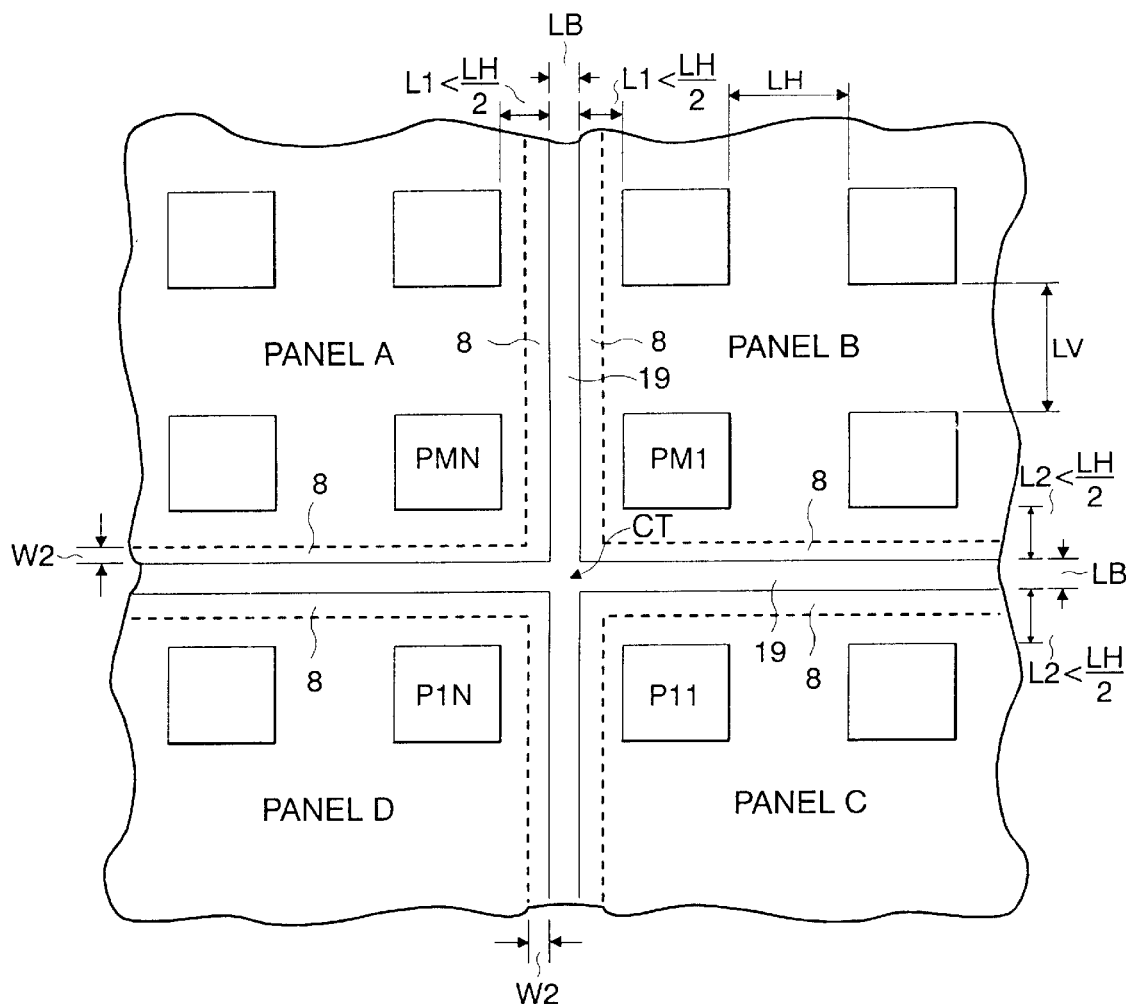
FIG. 2 shows an arrangement of pixel regions of the panels A, B, C and D.

Although, in the embodiment of the present invention, each of the distance between the pixel region PMN at the most lower right position of the panel A and the pixel region PM1 at the most lower left position of the panel B, and the distance between the pixel region P1N at the most upper right position of the panel D and the pixel region P11 at the most upper left position of the panel C is selected to the distance represented by 2L1+LB, as shown in the FIG. 2, the longer distance than 2L1+LB can be used. And although each of the distance between the pixel region PMN of the panel A and the pixel region P1N of the panel D, and the distance between the pixel region PM1 of the panel B and the pixel region P11 of the panel C is selected to distance represented by 2L2+LB, the longer distance than 2L1+LB can be used.

Although the TN mode is used in the LCD device of the present invention, other mode, such as an in-plan switching mode and a vertical alignment mode, can be used.

The present invention solves the problem that the TFTs in the pixel regions arranged proximity to the bonding region 19 are damaged during the rubbing process, the handling the discrete LCD panels, the assembling the LCD panels into the tiling panel, and the handling of the completed tiling panel, and can prevent the light of the back light from passing through the bonding region.

While the invention has been particularly shown and described with respect to preferred embodiments thereof, it will be understood by those skilled in the art that the foregoing and other changes in form and details may be made therein without departing from the spirit and scope of the invention.

Having thus described my invention, what I claim as new, and desire to secure by Letters Patent is:

1. A liquid crystal display (LCD) device comprising:
   a first LCD panel in which a pixel array substrate, on which a pixel array is formed, and an opposing substrate, on which a common electrode is formed, are sealed along a sealing region surrounding said pixel array; and
   a second LCD panel in which a pixel array substrate, on which a pixel array is formed, and an opposing substrate, on which a common electrode is formed, are sealed along a sealing region surrounding said pixel array;
   wherein one edge of said first LCD panel is positioned in proximity and adjacent to one edge of said second LCD panel; and
   wherein a light shielding and electrically conductive adhesive bonds said one edge of said first LCD panel and said one edge of said second LCD panel.

2. The LCD device according to claim 1, wherein said light shielding and electrically conductive adhesive is electrically connected to said common electrodes on said opposing substrates on said first and second LCD panels.

3. The LCD device according to claim 2, wherein a short ring is formed along remaining edges of each of said pixel array substrates of said first and second LCD panels, respectively; and wherein said light shielding and electrically conductive adhesive is electrically connected to said short rings.

4. LCD device according to claim 3, wherein said sealing region along said one edge of each of said pixel array substrates of said first and second LCD panels is separated from said one edge to expose a surface region of each of said pixel array substrates, respectively;
   wherein a contact electrode is formed on each of said surface regions of said pixel array substrates of said first and second LCD panels, said contact electrode on said pixel array substrate of said first LCD panel is connected to said short ring on said pixel array substrate of said first LCD panel, and said contact electrode on said pixel array substrate of said second LCD panel is connected to said short ring on said pixel array substrate of said second LCD panel; and
   wherein said light shielding and electrically conductive adhesive s electrically and mechanically bonded to said contact electrode on said pixel array substrate of said first LCD panel and to said contact electrode on said pixel array substrate of said second LCD panel.

5. The LCD device according to claim 4, wherein said short ring on said pixel array substrate is connected to said common electrode on said opposing substrate.

6. The LCD device according to claim 5, wherein said first and second LCD panels are fixed to a transparent supporting substrate.

7. The LCD device according to claim 5, wherein an upper surface of each of said first and second LCD panels is fixed to a first transparent supporting substrate, and a lower surface of each of said first and second LCD panels is fixed to a second transparent supporting substrate.

8. The LCD device according to claim 1, wherein a short ring is formed along remaining edges of each of said pixel array substrates of said first and second LCD panels, respectively, a contact electrode connected to said short ring is formed on a surface, along said one edge, of said pixel array substrate of each of said first and second LCD panels, and an edge of said contact electrode is aligned to an edge of said sealing region along said one edge.

9. A LCD device comprising:
   an upper left LCD panel in which a pixel array substrate, on which a pixel array is formed, and an opposing substrate, on which a common electrode is formed, are sealed along a sealing region surrounding said pixel array;
   an upper right LCD panel in which a pixel array substrate, on which a pixel array is formed, and an opposing substrate, on which a common electrode is formed, are sealed along a sealing region surrounding said pixel array;
   a lower right LCD panel in which a pixel array substrate, on which a pixel array is formed, and an opposing substrate, on which a common electrode is formed, are sealed along a sealing region surrounding said pixel array; and
   a lower left LCD panel in which a pixel array substrate, on which a pixel array is formed, and an opposing substrate, on which a common electrode is formed, are sealed along a sealing region surrounding said pixel array;
   wherein a right edge of said upper left LCD panel is positioned in proximity and adjacent to a left edge of said upper right LCD panel;
   wherein a bottom edge of said upper right LCD panel is positioned in proximity and adjacent to a top edge of said lower right LCD panel;
   wherein a left edge of said lower right LCD panel is positioned in proximity and adjacent to a right edge of said lower left LCD panel;

wherein a top edge of said lower left LCD panel is positioned in proximity and adjacent to a bottom edge of said upper left LCD panel; and wherein a light shielding and electrically conductive adhesive bonds said right edge of said upper left LCD panel and said left edge of said upper right LCD panel, bonds said bottom edge of said upper right LCD panel and said top edge of said lower right LCD panel, bonds said left edge of said lower right LCD panel and said right edge of said lower left LCD panel, and bonds said top edge of said lower left LCD panel and said bottom edge of said upper left LCD panel.

10. The LCD device according to claim 9, wherein said light shielding and electrically conductive adhesive is electrically connected to said common electrodes on each of said opposing substrates on said upper left LCD panel, said upper right LCD panel, said lower right LCD panel and said lower left LCD panel.

11. The LCD device according to claim 10, wherein a short ring is formed along remaining edges of each of said pixel array substrates of said upper left LCD panel, said upper right LCD panel, said lower right LCD panel and said lower left LCD panel, respectively; and wherein said light shielding and electrically conductive adhesive is electrically connected to said short rings.

12. The LCD device according to claim 11, wherein said sealing region along said right edge and said bottom, edge of said pixel array substrate of said upper left LCD panel is separated from right edge and said bottom edge to expose a surface region of said pixel array substrate, respectively, and a contact electrode is formed on said surface region along at least one of said right edge and said bottom edge;

wherein said sealing region along said left edge and said bottom edge of said pixel array substrate of said upper right LCD panel is separated from left edge and said bottom edge to expose a surface region of said pixel array substrate, respectively, and a contact electrode is formed on said surface region along at least one of said left edge and said bottom edge;

wherein said sealing region along said top edge and said left edge of said pixel array substrate of said lower right LCD panel is separated from top edge and said left edge to expose a surface region of said pixel array substrate, respectively, and a contact electrode is formed on said surface region along at least one of said top edge and said left edge;

wherein said sealing region along said right edge and said top edge of said pixel array substrate of said lower left LCD panel is separated from right edge and said top edge to expose a surface region of said pixel array substrate, respectively, and a contact electrode is formed on said surface region along at least one of said right edge and said top edge;

wherein said contact electrodes are connected to said short rings; and wherein said light shielding and electrically conductive adhesive is electrically and mechanically bonded to said contact electrodes.

13. The LCD device according to claim 12, wherein said short ring on said pixel array substrate is connected to said common electrode on said opposing substrate.

14. The LCD device according to claim 13, wherein said upper left LCD panel, said upper right LCD panel, said lower right LCD panel and said lower left LCD panel are fixed to a transparent supporting substrate.

15. The LCD device according to claim 13, wherein an upper surface of each of said upper left LCD panel, said upper right LCD panel, said lower right LCD panel and said lower left LCD panel is fixed to a first transparent supporting substrate, and a lower surface of each of said upper left LCD panel, said upper right LCD panel, said lower right LCD panel and said lower left LCD panel is fixed to a second transparent supporting substrate.

16. The LCD device according to claim 12, wherein a portion of said contact electrode is covered by said sealing region.

17. The LCD device according to claim 12, wherein said contact electrode is separated from said edge of said pixel array substrate.

18. The LCD device according to claim 12, wherein said contact electrode comprises a first portion formed on said surface region and a second portion formed between said sealing region and said pixel array, and said first portion and said second portion are connected.

19. The LCD device according to claim 12, wherein said contact electrode comprises a first portion formed on said surface region and a second portion covered by said sealing region, and said first portion and said second portion are connected.

20. The LCD device according to claim 9, wherein a short ring is formed along a top edge and a left edge of said pixel array substrate of said upper left LCD panel, a contact electrode connected to said short ring is formed on a surface, along said right edge and said bottom edge, of said pixel array substrate, and an edge of said contact electrode is aligned to edges of said sealing region along said right edge and said bottom edge, wherein a short ring is formed along a top edge and a right edge of said pixel array substrate of said upper right LCD panel, a contact electrode connected to said short ring is formed on a surface, along said left edge and said bottom edge, of said pixel array substrate, and an edge of said contact electrode is aligned to edges of said sealing region along said left edge and said bottom edge, wherein a short ring is formed along a right edge and a bottom edge of said pixel array substrate of said lower right LCD panel, a contact electrode connected to said short ring is formed on a surface, along said top edge and said left edge, of said pixel array substrate, and an edge of said contact electrode is aligned to edges of said sealing region along said top edge and said left edge, and wherein a short ring is formed along a left edge and a bottom edge of said pixel array substrate of said lower left LCD panel, a contact electrode connected to said short ring is formed on a surface, along said right edge and said top edge, of said pixel array substrate, and an edge of said contact electrode is aligned to edges of said sealing region along said right edge and said top edge.

21. The LCD device according to claim 9, wherein a contact electrodes is formed on an outside surface region, which exists outside of said sealing region, of said pixel array substrate of said upper left LCD panel, at each of an upper right corner region and the lower left corner region, respectively;

wherein a contact electrodes is formed on an outside surface region, which exists outside of said sealing region, of said pixel array substrate of said upper right LCD panel, at each of a lower right corner region and an upper left corner region, respectively;

wherein a contact electrodes is formed on an outside surface region, which exists outside of said sealing region, of said pixel array substrate of said lower right LCD panel, at each of an upper right corner region and the lower left corner region, respectively; and wherein a contact electrodes is formed on an outside surface region, which exists outside of said sealing region, of said pixel array substrate of said lower left LCD panel, at each of a lower right corner region and an upper left corner region, respectively.

* * * * *